United States Patent
Chen et al.

(10) Patent No.: US 10,703,479 B2
(45) Date of Patent: Jul. 7, 2020

(54) UNMANNED AERIAL VEHICLE, CONTROL SYSTEMS FOR UNMANNED AERIAL VEHICLE AND CONTROL METHOD THEREOF

(71) Applicant: INDUSTRIAL TECHNOLOGY RESEARCH INSTITUTE, Hsinchu (TW)

(72) Inventors: Guo-Ruei Chen, Yunlin County (TW); Luo-Wei Tsai, Taipei (TW); Yeh-Kai Chou, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 296 days.

(21) Appl. No.: 15/921,625

(22) Filed: Mar. 14, 2018

(65) Prior Publication Data

US 2019/0161186 A1     May 30, 2019

(30) Foreign Application Priority Data

Nov. 30, 2017   (TW) .............................. 106141808 A (51) Int. Cl.
*B64C 39/02*     (2006.01)
*H04N 5/232*     (2006.01)
(Continued)

(52) U.S. Cl.
CPC ......... *B64C 39/024* (2013.01); *G05D 1/0202* (2013.01); *G06K 9/0063* (2013.01);
(Continued)

(58) Field of Classification Search
CPC ........ B64C 2201/127; B64C 2201/146; B64C 39/024; G05D 1/0202; G05D 1/101;
(Continued)

(56) References Cited

U.S. PATENT DOCUMENTS 6,634,593 B2   10/2003  Lepretre et al.
8,498,447 B2    7/2013  Derbanne
(Continued)

FOREIGN PATENT DOCUMENTS

CN   101511022 A   8/2009
CN   104316057 A   1/2015
(Continued)

OTHER PUBLICATIONS

TW Office Action dated Oct. 4, 2018 as received in Application No. 106141808.
(Continued)

*Primary Examiner* — Babar Sarwar
(74) *Attorney, Agent, or Firm* — Maschoff Brennan (57) ABSTRACT

A UAV (Unmanned Aerial Vehicle) control method comprises: obtaining a first image; obtaining a second image after obtaining the first image; calculating a plurality of feature points respectively according to the first image and the second image by a computing device, extracting a first feature point set and a second feature point set by the computing device; calculating a first-axial displacement and a second-axial displacement according to the first feature point set and the second feature point set by the computing device; calculating a first ROI (Region Of Interest) area, a second ROI and a third-axial displacement according to the first feature point set and the second feature point set by the computing device; adjusting a camera pose or a flight path of the UAV according to the first-axial displacement, the second-axial displacement and the third-axial displacement.

10 Claims, 5 Drawing Sheets

(51) Int. Cl.
*G05D 1/02* (2020.01)
*G06K 9/32* (2006.01)
*G06K 9/62* (2006.01)
*G06K 9/00* (2006.01)

(52) U.S. Cl.
CPC ......... *G06K 9/3233* (2013.01); *G06K 9/6223* (2013.01); *H04N 5/232* (2013.01); *H04N 5/23296* (2013.01); *B64C 2201/127* (2013.01); *B64C 2201/146* (2013.01)

(58) Field of Classification Search
CPC .. G06K 9/0063; G06K 9/3233; G06K 9/4671; G06K 9/6223; H04N 5/232; H04N 5/23296
See application file for complete search history.

(56) References Cited

U.S. PATENT DOCUMENTS

| | | | |
|---|---|---|---|
| 8,594,862 B2 | 11/2013 | Callou et al. | |
| 8,687,900 B2* | 4/2014 | Hwang | G06K 9/00228 382/103 |
| 8,718,838 B2 | 5/2014 | Kokkeby et al. | |
| 8,965,598 B2 | 2/2015 | Kruglick | |
| 9,164,506 B1 | 10/2015 | Zang | |
| 9,443,349 B2 | 9/2016 | Wang et al. | |
| 9,505,494 B1 | 11/2016 | Marlow et al. | |
| 9,513,635 B1 | 12/2016 | Bethke et al. | |
| 9,734,427 B2* | 8/2017 | Lin | H04N 5/23238 |
| 9,997,080 B1* | 6/2018 | Chambers | G08G 5/045 |
| 10,254,767 B1* | 4/2019 | Kamon | B64D 43/00 |
| 2006/0126737 A1 | 6/2006 | Boice et al. | |
| 2011/0290937 A1* | 12/2011 | Salkeld | G05D 1/0094 244/80 |
| 2014/0037278 A1* | 2/2014 | Wang | F16M 11/10 396/55 |
| 2014/0180914 A1* | 6/2014 | Abhyanker | G01C 1/00 705/39 |
| 2014/0210663 A1* | 7/2014 | Metzler | G01C 15/00 342/357.34 |
| 2014/0240498 A1* | 8/2014 | Ohtomo | B64D 47/08 348/144 |
| 2015/0057844 A1* | 2/2015 | Callou | B64C 27/08 701/3 |
| 2016/0009381 A1* | 1/2016 | Benatar | B64C 25/34 244/103 R |
| 2016/0063987 A1* | 3/2016 | Xu | B64C 39/024 381/71.12 |
| 2016/0194079 A1* | 7/2016 | Montreuil | B64C 39/024 701/2 |
| 2016/0198088 A1* | 7/2016 | Wang | B64D 47/08 348/36 |
| 2017/0108857 A1* | 4/2017 | Line | B64C 39/024 |
| 2017/0166309 A1* | 6/2017 | Sekiya | B64D 11/062 |
| 2017/0185259 A1* | 6/2017 | Chen | B64C 39/024 |
| 2017/0364093 A1* | 12/2017 | Mari Mari | B64C 39/024 |
| 2018/0002017 A1* | 1/2018 | Abeles | B64F 5/60 |
| 2018/0022472 A1* | 1/2018 | Chevalley | H04N 5/2253 701/3 |
| 2018/0143636 A1* | 5/2018 | Pinto | G05D 1/0088 |
| 2018/0149479 A1* | 5/2018 | Tian | G05D 1/0094 |
| 2018/0149949 A1* | 5/2018 | Kim | F16M 11/06 |
| 2018/0164799 A1* | 6/2018 | Hong | G05D 1/0044 |
| 2018/0307230 A1* | 10/2018 | Iwakura | G05D 1/0202 |
| 2019/0004543 A1* | 1/2019 | Kennedy | G05D 1/102 |
| 2019/0011934 A1* | 1/2019 | DeBitetto | G05D 1/102 |
| 2019/0018428 A1* | 1/2019 | Liu | G01C 11/04 |
| 2019/0031341 A1* | 1/2019 | Gomez Gutierrez | B64C 27/08 |
| 2019/0033892 A1* | 1/2019 | Gomez Gutierrez | G05D 1/101 |
| 2019/0102623 A1* | 4/2019 | Flood | A01G 23/00 |
| 2019/0179344 A1* | 6/2019 | Qu | B64C 39/024 |
| 2019/0185161 A1* | 6/2019 | Eleryan | B64C 27/08 |
| 2019/0202578 A1* | 7/2019 | Fox | B64C 39/024 |
| 2019/0221923 A1* | 7/2019 | Lv | H01Q 5/378 |
| 2019/0260191 A1* | 8/2019 | Lavoie | B64C 39/024 |
| 2019/0318634 A1* | 10/2019 | Ma | B64C 39/024 |
| 2019/0324478 A1* | 10/2019 | Lin | G05D 1/085 |
| 2020/0051445 A1* | 2/2020 | Priest | B64D 47/08 |

FOREIGN PATENT DOCUMENTS

| | | |
|---|---|---|
| CN | 106682668 A | 5/2017 |
| JP | 2007-235333 A | 9/2007 |
| TW | I444593 B | 7/2014 |
| TW | 201534512 A | 9/2015 |
| TW | I524758 B | 3/2016 |
| TW | M524967 U | 7/2016 |
| TW | I554976 B | 10/2016 |
| TW | I578124 B | 4/2017 |
| TW | 201723789 A | 7/2017 |
| TW | I602433 B | 10/2017 |

OTHER PUBLICATIONS

Barajas, M., et al. "Visual Servoing of UAV Using Cuboid Model with Simultaneous Tracking of Multiple Planar Faces," IEEE/RSJ International Conference on Intelligent Robots and Systems, pp. 596-601 (Nov. 3-7, 2013).
Bay, H., et al., "SURF: Speeded Up Robust Features," European Conference on Computer Vision, pp. 404-417 (2006).
Kanungo, T., et al., "An efficient k-means clustering algorithm," Analysis and Implementation, Electrical Engineering and Computer Science, vol. 24, Issue 7, pp. 881-892 (Aug. 7, 2002).
Lowe, D. G., "Distinctive Image Features from Scale-Invariant Keypoints," International Journal of Computer Vision, vol. 60, Issue 2, pp. 91-110 (Nov. 2004).
Mikolajczyk, K., and Schmid, C., "A Performance Evaluation of Local Descriptors," IEEE Transactions on Pattern Analysis and Machine Intelligence, vol. 27, Issue 10, pp. 1615-1630 (Aug. 22, 2005).
Pall, E., et al., "Railway track following with the AR.Drone using vanishing point detection," IEEE International Conference on Automation, Quality and Testing, Robotics, pp. 1-6 (May 22-24, 2014).
Pestana, J., et al., "Vision based gps-denied object tracking and following for unmanned aerial vehicles," IEEE International Symposium on Safety, Security, and Rescue Robotics (SSRR), pp. 1-6 (Jan. 23, 2013).
Stolle, S., and Rysdyk, R., "Flight path following guidance for unmanned air vehicles with pan-tilt camera for target observation," IEEE The 22nd Digital Avionics Systems Conference, vol. 2, pp. 8.B.3-1-8B.-3-12 (Oct. 12-16, 2003).
Yadav, H., et al., "A real-time ball trajectory follower using Robot Operating System," Third International Conference on Image Information Processing (ICIIP), pp. 511-515 (Dec. 21-24, 2015).
Zakaria, O., et al., "Deterministic Method of Visual Servoing: robust object tracking by drone," 13th International Conference on Computer Graphics, Imaging and Visualization (CGiV), pp. 414-422 (Mar. 29, 2016-Apr. 1, 2016).

\* cited by examiner

ROI
FIG. 4

UNMANNED AERIAL VEHICLE, CONTROL SYSTEMS FOR UNMANNED AERIAL VEHICLE AND CONTROL METHOD THEREOF

CROSS-REFERENCE TO RELATED APPLICATIONS

This non-provisional application claims priority under 35 U.S.C. § 119(a) on Patent Application No(s). 106141808 filed in Taiwan on Nov. 30, 2017, the entire contents of which are hereby incorporated by reference.

TECHNICAL FIELD

This disclosure relates to an unmanned aerial vehicle (UAV) with its control system, and control method, particularly for the UAV with a camera.

RELATED ART

In order to provide the driving safety and the smooth traffic within the service life of the bridge, the regular bridge inspection becomes an important part of bridge maintenance works. Generally, most bridge inspections rely on the visual examination. However, the steep terrain around the bridge makes the observation difficult and inspectors need bridge inspection vehicles, aerial work platform or boat to approach the bridge. From the perspective of industrial safety, inspectors are exposed to dangerous environment when riding on the above special vehicles. On the other hand, inspection vehicles are bulky, not only time-consuming to operate but also expensive to use.

As a new generation of a technology product, UAVs have been widely utilized in aerial photography, engineering supervision, agriculture and forestry operations, environmental observation and disaster search and rescue and other fields in recent years. However, in terms of bridge inspection, the most of the bridge inspections conducted by UAVs nowadays still need human assistance, at least one professional UAV pilot for example. Because the bridge has to adopt a special structure (such as non-linear structure or non-equal-height structure) to fit the geomorphology, the flight with a fixed-schedule such as setting start-to-finish coordinates based on the Global Positioning System (GPS) cannot extensively apply to all types of bridges. In addition, apparatus such as the GPS or the barometer may have estimation error, and unpredictable conditions such as deviation from the originally planned route due to wind blowing, the above situations increase the difficulty of automatic navigation design. On the other hand, if SLAM, a visual navigation method is adopted, it has to establish a topological map of the target bridge, together with complicated computations for getting an accurate relation of camera position and target position. The Real Time Kinematic (RTK) technique provides up to centimeter-level accuracy, but it has to install a base station, mobile stations and a radio modem additionally. Therefore, applying SLAM or RTK in bridge inspection is not cost-effective.

SUMMARY

According to one or more embodiments of this disclosure, a UAV control method adapted to a UAV with a camera for shooting a target comprising: obtaining a first image at a first timing; obtaining a second image by the camera at a second timing after the first timing; calculating a plurality of feature points respectively according to the first image and the second image by a computing device; extracting a first feature point set and a second feature point set by the computing device, wherein the first feature point set comprises at least three feature points from the plurality of the feature points of the first image, and the second feature point set comprises at least three feature points from the plurality of the feature points of the second image; calculating a first-axial displacement and a second-axial displacement according to the first feature point set and the second feature point set by the computing device; calculating a first ROI area and a second ROI area respectively according to the first feature point set and the second feature point set by the computing device and calculating a third-axial displacement according to the first ROI area and the second ROI area; and adjusting a camera pose or a flight path of the UAV according to the first-axial displacement, the second-axial displacement and the third-axial displacement by a control device.

According to one or more embodiments of this disclosure, a UAV control system comprising: a camera configured to shoot a first image and a second image during a flight of the UAV, wherein the first image is shot at a first timing, the second image is shot at a second timing, and the first timing is earlier than the second timing; a computing device electrically connected to the camera, wherein the computing device is configured to calculate a displacement vector of the UAV during the first timing and the second timing based on the first image and the second image; and a control device electrically connected to the computing device, wherein the computing device is configured to selectively adjust a gimbal for adjusting a camera pose or a flight path of the UAV according to the displacement vector.

According to one or more embodiments of this disclosure, a UAV comprising: a flight system comprising a propeller configured to provide an upward buoyancy for the UAV by rotation; a motor coupled to the propeller with a spindle for providing a rotation power; and a motor drive electrically connected to the motor and configured to drive the motor according to a flight control instruction; a control system comprising: a camera configured to shoot a first image and a second image during a flight of the UAV, wherein the first image is shot at a first timing, the second image is shot at a second timing, and the first timing is earlier than the second timing; a computing device electrically connected to the camera, wherein the computing device is configured to calculate a displacement vector of the UAV during the first timing and the second timing based on the first image and the second image; and a control device electrically connected to the computing device, wherein the control device is configured to selectively send a gimbal adjustment instruction for adjusting a camera pose or to send the flight control instruction for adjusting a flight path of the UAV according to the displacement vector; a gimbal electrically connected to the camera and the control device, wherein the gimbal comprises a servomotor and the gimbal is configured to receive the gimbal adjustment instruction to drive the servomotor for adjusting a camera pose; and a frame configured to carry the flight system, the control system, and the gimbal.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
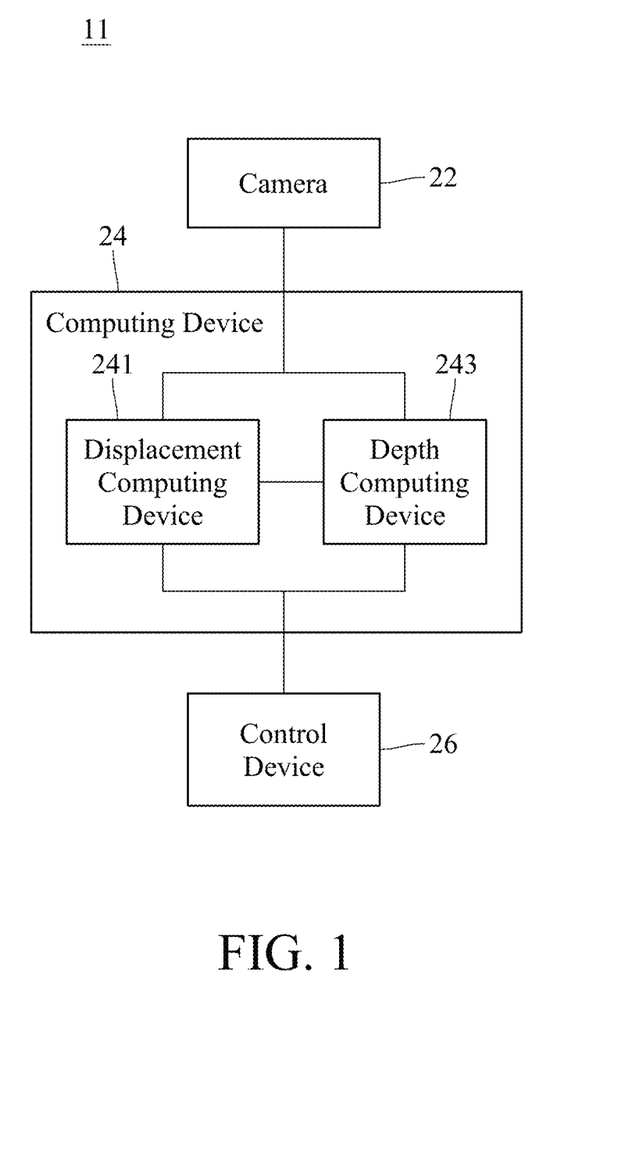
FIG. 1 is a block diagram of a UAV control system according to an embodiment of the present disclosure.
Figure 2:
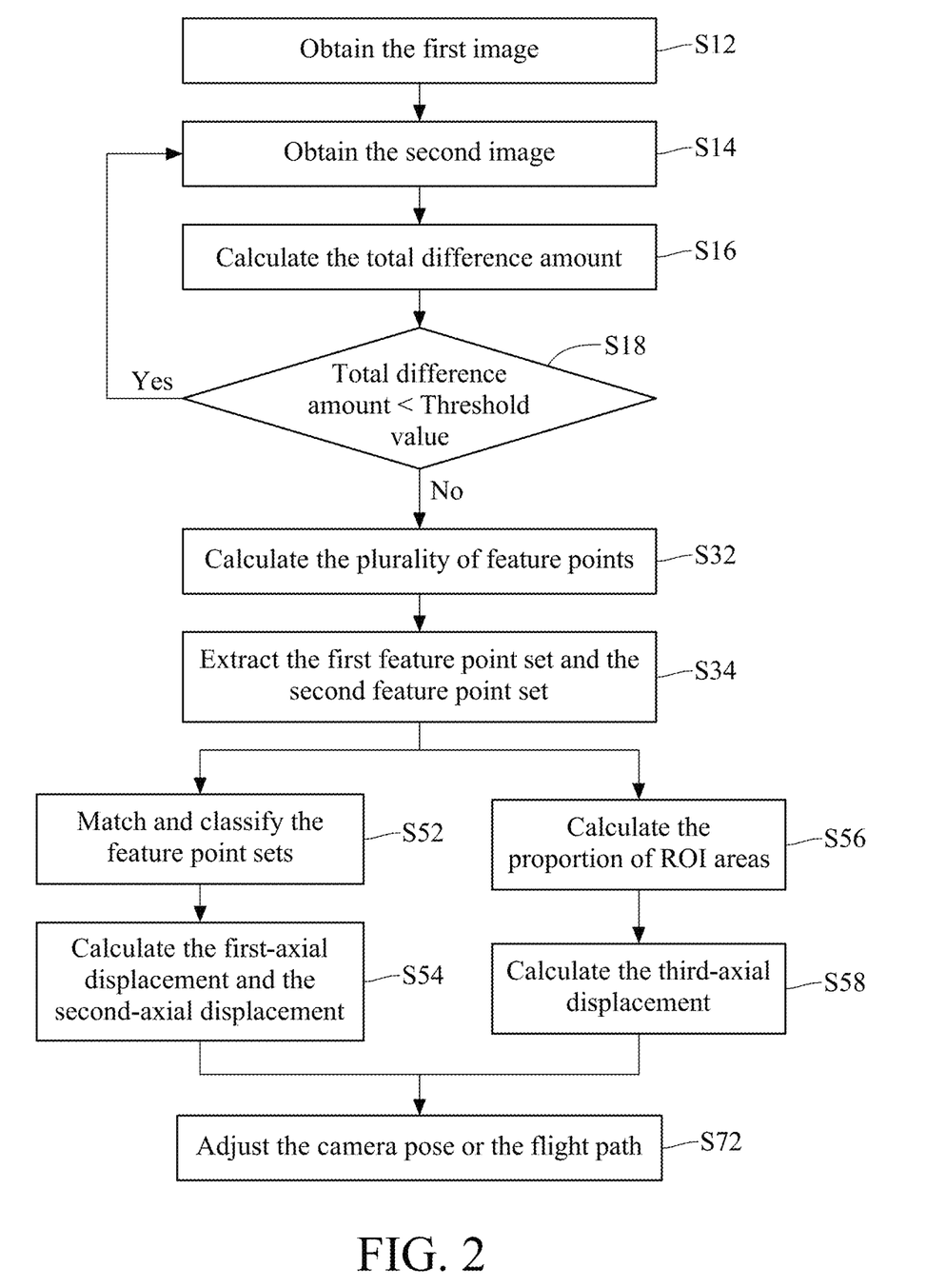
FIG. 2 is a flowchart of a UAV control method according to an embodiment of the present disclosure.

Please refer to FIG. 1 and FIG. 2. FIG. 1 shows a UAV control system 11 according to an embodiment of the present disclosure. FIG. 2 shows a flowchart of a UAV control method running on said UAV control system 11. As shown in FIG. 1, the UAV control system 11 comprises a camera 22, a computing device 24, and a control device 26. The computing device 24 electrically connects to the camera 22. The control device 26 electrically connects to the computing device 24.

Please refer to the step S12 and the step S14 in FIG. 2. The UAV control method starts from obtaining a first image at a first timing as shown in the step S12, and then obtaining a second image at the second timing by the camera 22 as shown in the step S14, wherein the first timing is earlier than the second timing. Typically, the camera 22 shoots the first image at the first timing and shoots the second image at the second timing. The control device 26 comprises a timer for accumulating an interval time during the first timing and second timing in an embodiment of the present disclosure. Specifically, the control device 26 enables the timer to start counting the interval time when the camera 22 shoots the first image at the first timing, the control device 26 activates the camera 22 to shoot the second image at the second timing when the interval time reaches a default value. In another embodiment, the control device 26 determines the shooting interval between the first timing and the second timing by further cooperating with sensors such as an accelerometer used to detect the flying speed or an altimeter for detecting the flying height. Generally speaking, the camera 22 takes two still pictures of a target (for example, a bridge) and uses them as the first image and the second image. However, the camera 22 can also take a video of the target and the control device 26 captures two frames from the video at the specified first timing and the specified second timing. Moreover, the first image can be shot in advance by other camera and be inputted to the UAV control system 11 before the flight of the UAV. In other words, the present disclosure does not limit the way to obtain the first image and the second image.

Please refer to the step S16 in FIG. 2. In the step S16, the computing device S24 calculates a total difference amount according to the first image and the second image. Specifically, the computing device 24 calculates the different extent between the first image and the second image after receiving two images. In the UAV control method of the present disclosure, it needs to calculate a displacement vector based on two images (the first image and the second image) captured in a period of time, so it has to ensure that the different extent between the second image shot by the camera 22 and the first image is enough. Practically, the computing device 24 divides the first image and the second image into n×n blocks respectively, wherein n is a natural number greater than 1. The computing device 24 calculates each difference amount of two corresponding blocks in the first image and the second image according to the following equation:

$$B_{\mathit{diff}} = \frac{\left[\left(\frac{M_{i,k} + M_{i,p}}{2}\right)^2 - \left(\frac{V_{i,k} + V_{i,p}}{2}\right)^2\right]}{V_{i,k} V_{i,p}}, \quad (1)$$

wherein $B_{\mathit{diff}}$ is the difference amount, $M_{i,k}$ and $V_{i,k}$ respectively represent the average and the variance of the i-th block of the k-th image, $M_{i,p}$ and $V_{i,p}$ respectively represent the average and the variance of the i-th block of the p-th image. The aforementioned k-th image and p-th image are equivalent to the first image and the second image in this embodiment. The i-th blocks in two images are viewed as "No obvious difference" if the $B_{\mathit{diff}}$ is smaller than a default threshold value $T_b$. The computing device 24 repeatedly calculates the difference amount of every block according to the equation (1), and then summarizes these values to get a total difference amount of the entire picture. Please refer to the step S18 in FIG. 2. In the step S18, the computing device 24 determines whether the total difference amount is smaller than a default threshold value $T_f$. The second image is determined as having enough difference amount compared to the first image if the total difference amount is greater than or equal to the default threshold value $T_f$, and the step S32 will be executed then. On the contrary, the second image is determined as having no obvious difference compared to the first image if the total difference amount is smaller than the default threshold value $T_f$, and the computing device 24 drops the second image and returns to the step S14 for getting another image as the second image (for example, the computing device 24 notifies the control device 26 to activate the camera 22 to shoot another picture as the second image), and then the computing device 24 calculates the total difference amount of the images again according to the step S16. However, the step S16 is configured to promote the accuracy of the embodiment, and it's not a necessary step to fulfill the UAV control method of the present disclosure.

Figure 3:
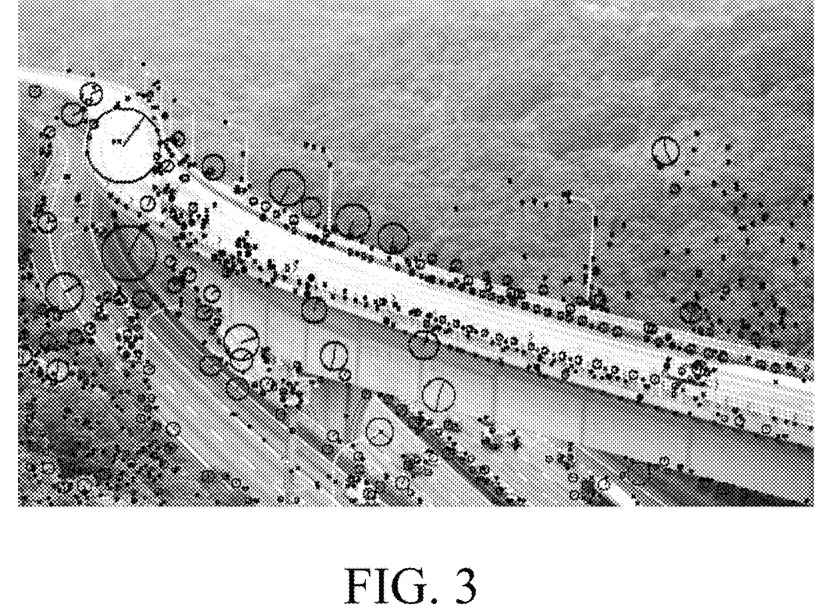
FIG. 3 is a schematic view of the feature points indication according to an embodiment of the present disclosure.

Please refer to the step S32 in FIG. 2. After getting the first image and the second image (and it's better to execute the step S16 to ensure that the second image has enough difference amount compared to the first image), in the step S32, the displacement computing device 241 inside the computing device 24 respectively calculates a plurality of feature points from the first image and a plurality of feature points from the second image. The purpose of the step S32 is to find interested points whose gradient change significantly from the image. It is usually to encounter a scale-variant problem when performing the feature matching among different images, that is to say, the traced target has different sizes in different images, so that the feature match procedure of the same target may not succeed due to different scales. Therefore, an embodiment of the present disclosure adopts Scale-Invariant Feature Transform (SIFT) algorithm. SIFT algorithm extracts feature points with scale invariance and rotational invariance as well as descriptors corresponding to feature points for describing local features of images. In other embodiments, the computing device 24 can choose Speeded Up Robust Feature (SURF) algorithm or Gradient location-orientation histogram (GLOH) algorithm to calculate the image's feature points. Please refer to FIG. 3, which is an image of a bridge, wherein each feature points calculated by the displacement computing device 241 of the computing device 24 are indicated as each centre point of the black circles as shown in FIG. 3, and the direction of the radius (from the centre point to the circumference) represents the direction of the maximum one of all eigenvectors of the descriptors of the feature point.

Figure 4:
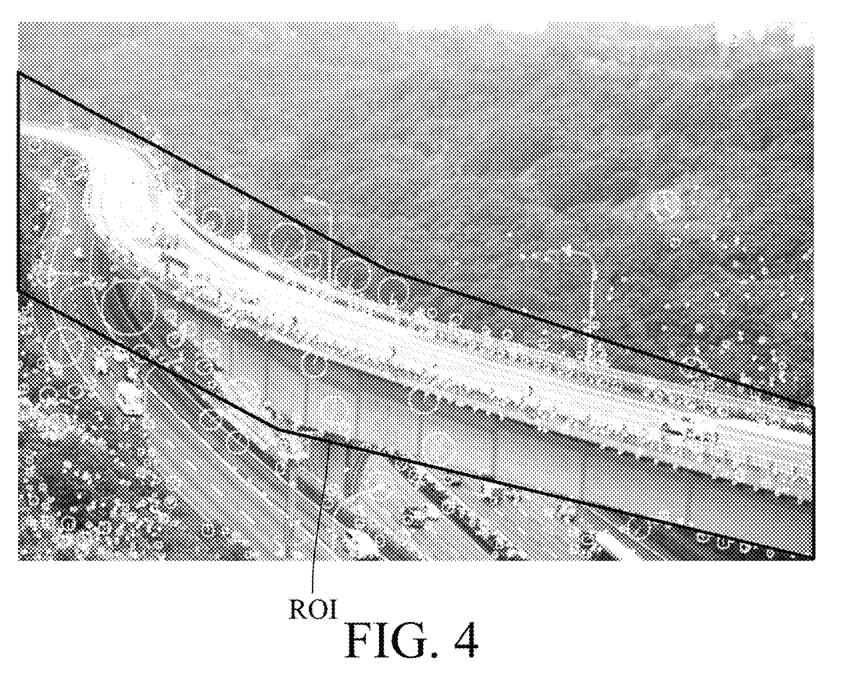
FIG. 4 is a schematic view of the ROI selection according to an embodiment of the present disclosure.

Please refer to the step S34 in FIG. 2. In the step S34, the displacement computing device 241 of the computing device 24 extracts a first feature point set and a second feature point set, wherein the first feature point set comprises at least three feature points from the plurality of feature points of the first image, and the second feature point set also comprises at least three feature points from the plurality of feature points of the second image. It should be noticed that extracting the first feature point set and the second feature point set by the displacement computing device 241 of the computing device 24 is equivalent to Region of Interest (ROI) selections from the first image and the second image. The tracing target in the image is surrounded by the ROI using a shape such as a box, a circle, an oval, or an irregular polygon. ROI selections can reduce the processing time of remaining steps and increase the computing accuracy. Please refer to FIG. 4, which is a schematic view of an ROI selection according to FIG. 3, and it's obvious that the ROI is the main body of the bridge. The control device 26 of the UAV can trace the target according to the ROI and control the camera 22 to perform subsequent photographing works on the target after the ROI is determined.

In an embodiment, the computing device 24 can store an image with selected ROI as a reference image before getting the first image and the second image by the camera 22, and then extract the feature point set according to the feature points in this reference image in the step S34.

In an embodiment, the computing device 24 utilizes Principal Component Analysis (PCA) to output representative feature points for extracting the first feature point set and the second feature point set after the plurality of feature points are calculated in the step S32, so the dimensions of descriptors of feature points can be further decreased. PCA can be done by eigenvalue decomposition of a data covariance matrix so as to get the principal components (i.e., eigenvectors) with their loadings (i.e., eigenvalues). PCA reduces the dimension of eigenvectors of descriptors and preserves the maximum variance of a descriptor by preserving the principle components corresponding to bigger eigenvalues and dropping the principal components corresponding to smaller eigenvalues. As set forth above, the computing device 24 performs the matrix operations to transform eigenvectors with higher dimension into a set of new eigenvectors whose eigenvalues are arranged in descending order, this set of new eigenvectors are linear combinations of original eigenvectors, and new eigenvectors are orthogonal to each other without any relevance. However, it should be noticed that executing PCA is not a necessary step, it depends on the computing power of the computing device 24 and the number of feature points of the first image and the second image to decide whether or not to execute PCA. On the other hand, the representative feature points can be extracted in other ways, for example, the user manually extracts feature points from the first image and from the second image.

Please refer to the step S52 and the step S54 in FIG. 2. In the step S52, the computing device 24 matches and classifies the first feature point set and the second feature point set. Specifically, in an embodiment, the computing device 24 finds similar features according to the descriptors of the feature points inside the ROI from the first image and the second image. The computing device 24 can adopt RANdom SAmple Consensus (RANSAC) algorithm, or adopt the epipolar line together with the fundamental matrix computing to output a plurality set of matched feature points. The computing device 24 then adopts K-means clustering algorithm to classify these matched feature points into K clusters. In the step S54, the computing device 24 calculates the main movement direction according to the plurality set of matched feature points. Specifically, the displacement computing device 241 of the computing device 24 executes PCA on every cluster to output the directions of their principal components according to the K clusters generated in the step S52. The direction of the principal component comprises a first-axial displacement and a second-axial displacement, wherein the first axis is such as the X-axis and the second axis is such as the Y-axis. The displacement computing device 241 of the computing device 24 further respectively summarizes the first-axial displacement and the second-axial displacement of all clusters and then calculating the mean values, so that the computing device 24 can output the main movement direction from the plurality of first-axial displacements and the plurality of second-axial displacements. In short, the computing device 24 calculates the main movement direction of the camera 22 during the period of getting two images by the camera 22 according to the step S52 and the step S54.

Please refer to the step S56 in FIG. 2. In the step S56, the depth computing device 243 of the computing device 24 calculates the proportion of ROI areas, wherein the depth computing device 243 couples to the displacement computing device 241. In an embodiment, in order to confirm the distance variation between the camera 22 and the target when the camera 22 is shooting the first image and the second image, the depth computing device 243 of the computing device 24 puts the plurality of feature points inside the ROI of the first image and the plurality of feature points inside the ROI of the second image on a plane respectively for matching them with n-sided polygons, then the depth computing device 243 obtains the coordinate values of n feature points locating at vertices of n-sided polygon, and substituting these coordinate values into the following equation to calculate the first ROI area and the second ROI area respectively:

$$A = \frac{1}{2}\left(\left|\begin{matrix}x_0 & x_1\\y_0 & y_1\end{matrix}\right| + \left|\begin{matrix}x_1 & x_2\\y_1 & y_2\end{matrix}\right| + \ldots + \left|\begin{matrix}x_{n-2} & x_{n-1}\\y_{n-2} & y_{n-1}\end{matrix}\right| + \left|\begin{matrix}x_{n-1} & x_0\\y_{n-1} & y_0\end{matrix}\right|\right), \quad (2)$$

in which A is the area, and $(x_0, y_0)$, $(x_1, y_1)$, $(x_{n-1}, y_{n-1})$ are coordinates of n feature points, and these n feature points are n vertices on the n-sided polygon.

Please refer to the step S58 in FIG. 2. In the step S58, the computing device 24 calculates a third-axial displacement. Specifically, after calculating the first ROI area and the second ROI area, the depth computing device 243 of the computing device 24 further calculates a third-axial (Z-axis)

displacement according to the focus of the camera 22 and the proportion of two areas. In another embodiment with the consideration of reducing the computations, after obtaining the coordinate values of the first feature point set and the second feature point set, the depth computing device 243 of the computing device 24 only calculates the square of the distance of two feature points (or the area of a triangular formed by three of the non-collinear feature points), takes the result as a reference value of the area, and calculates the proportion as well as the third-axial displacement based on the reference value of the area.

Please refer to the step S72 in FIG. 2. In the step S72, the control device 26 adjusts the camera 22 pose or the flight path of the UAV according to the information comprising the first-axial displacement, the second-axial displacement and the third-axial displacement. Specifically, in an embodiment, the control device 26 of the UAV control system 11 further comprises a positioning device. Said positioning device is such as a GPS sensor configured to get the current world coordinate of the UAV. The GPS coordinates of the start point, the end point and halfway anchor points on the way of the current flight path of the UAV can be configured before the UAV performs the aerial photography (that is: before obtaining the first image in the step S12). Based on the GPS coordinates (which can be regarded as absolute location information) and the displacement vector (which can be regarded as relative location information) calculated by the computing device 24, the control device 26 can adjust the flight path according to the world coordinate and the displacement vector, that is, the control device 26 selectively sends control signals to adjust the camera 22 pose so as to achieve the effect of capturing the target more clearly. The control signals are configured to adjust the flight path to prevent the UAV from deviating from the original route. Moreover, the control signals can dynamically adjust the UAV itself for keeping proper distance against to the target, thus avoiding being too close to the target that leads to a collision, or avoiding too far from the target that the camera captures a scene unrelated to the target.

Figure 5:
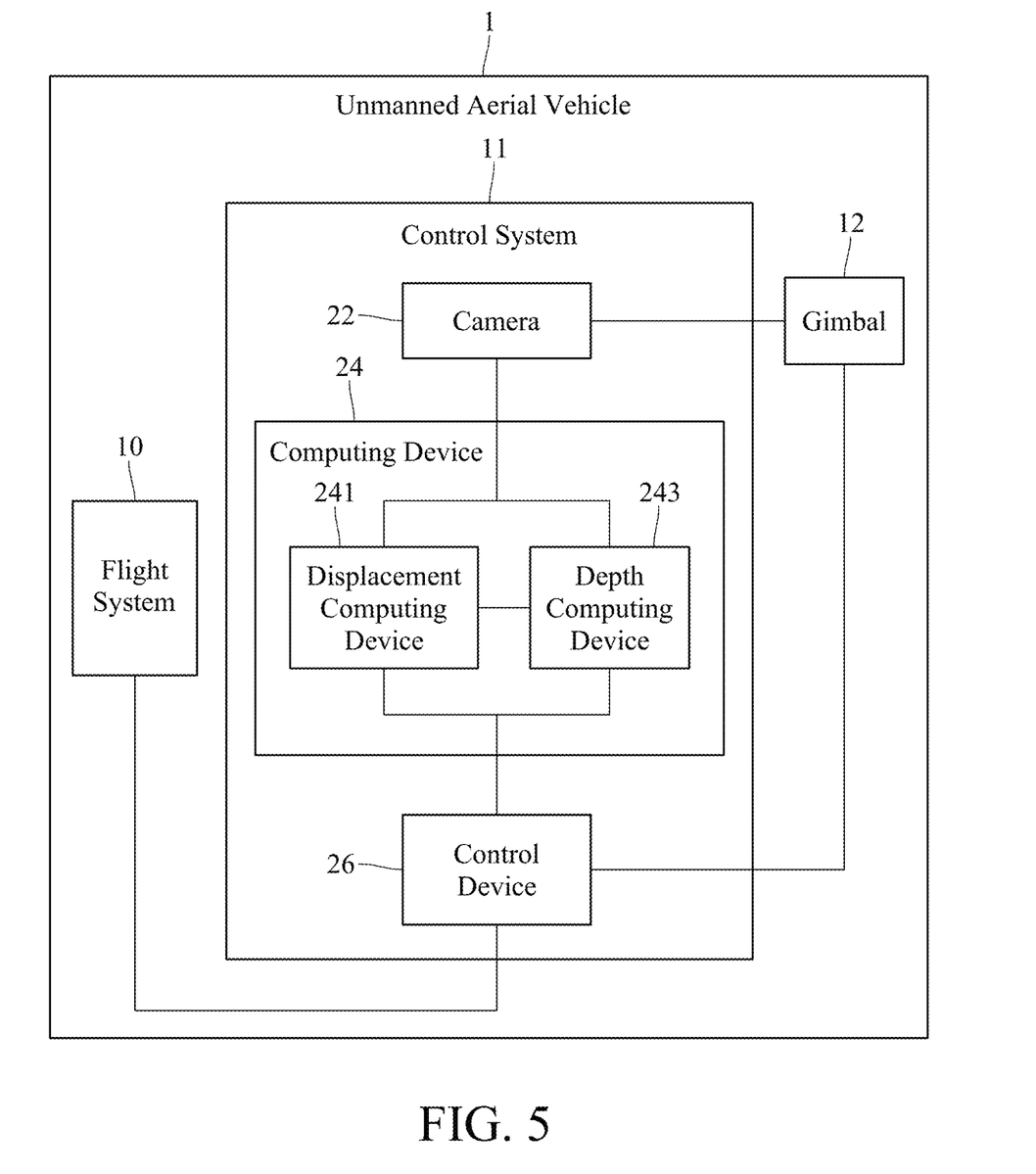
FIG. 5 is a block diagram of a UAV according to an embodiment of the present disclosure.
Figure 6:
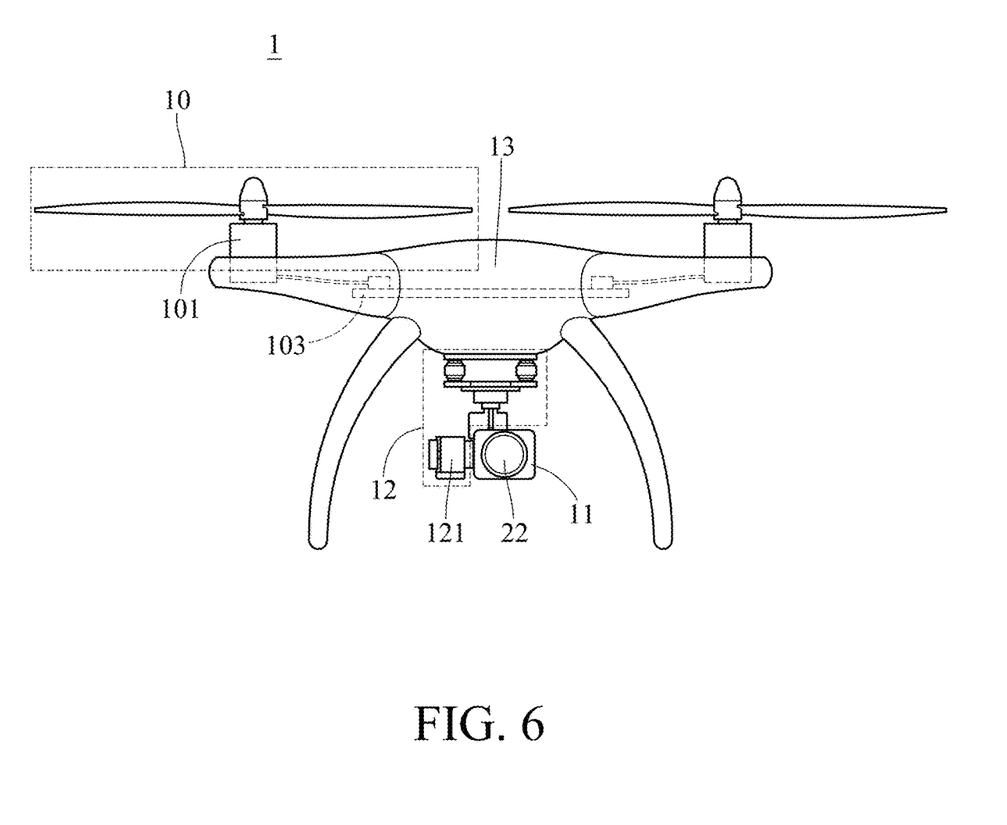
FIG. 6 is a structural view of the UAV according to an embodiment of the present disclosure.

Please refer to FIG. 5 and FIG. 6. FIG. 5 is a block diagram of a UAV according to an embodiment of the present disclosure. FIG. 6 is a structural view of the UAV according to an embodiment of the present disclosure. The UAV 1 of an embodiment of the present disclosure comprises a flight system 10, a control system 11, a gimbal 12 and a frame 13. The flight system 10 comprises a propeller, a motor 101, and a motor drive 103. The propeller can provide an upward buoyancy by its rotation. The motor 101 couples to the propeller by a spindle for providing a rotation power. The motor drive 103 electrically connects to the motor 101 and drives the motor 101 according to a flight control instruction. The control system 11 of UAV 1 and the control method thereof are as described above, which is not described herein again. The gimbal 12 electrically connects to the camera 22 and the control device 26. The gimbal 12 comprises a servomotor 121 and the gimbal is configured to receive the gimbal adjustment instruction to drive the servomotor 121 for adjusting a camera pose. The frame 13 is configured to carry the flight system 10, the control system 11 and the gimbal 12, and the design of the frame 13 directly reflects the appearance and characteristic(s) of UAV 1.

In the present disclosure, the computing device 24 is configured to control the overall operations of the UAV 1. The computing device 24 is such as a CPU (Central Processing Unit), a programmable microprocessor, a DSP (Digital Signal Processor), a programmable controller, an ASIC (Application Specific Integrated Circuits), a PLD (Programmable Logic Device, PLD) or other similar devices. The hardware structure of the computing device 24 is not limited to the present disclosure. The displacement computing device 241 and the depth computing device 243 are such as DSPs or ASICs that configured for specified computing tasks. For example, the computing device 24 obtains the codes of the displacement computing device 241 and the depth computing device 243 from the storage device, controls the displacement computing device 241 to calculate the plurality of feature points from first image and the second image for further calculating the first-axial displacement and the second-axial displacement; and controls the depth computing device 243 to calculate the first ROI area and the second ROI area for further calculating the third-axial displacement.

It should be noticed that, in an embodiment of the UAV 1 of the present disclosure, please refer to the step S72 in FIG. 2 and FIG. 5 for the output part of the control system 11. The first-axial displacement, the second-axial displacement and the third-axial displacement calculated by the computing device 24 can form a displacement vector to represent the three-dimensional displacement during the shooting of first image and the shooting of the second image. The computing device 24 further constructs a transformation mechanism of coordinate systems between the world coordinate and the camera coordinate, and calculates the displacement of UAV 1 in the world coordinate system according to the camera calibration and extrinsic parameter of the camera model. In practical, the computing device 24 takes the displacement vector as an adjustment parameter of the flight path together with the absolute coordinate from the GPS device, and sends a flight control instruction to the control device 26 for adjusting the flight path of the UAV 1 instantaneously. In another embodiment, the control device 26 can send a gimbal adjustment instruction according to the displacement vector. The gimbal 12 enables the three-axis servomotor 121 according to the gimbal adjustment instruction to change the camera 22 pose to adjust the shot angle for shooting the target more precisely next time.

In sum, the UAV control method of the present disclosure comprises obtaining the image of the target by the camera, calculating feature points of the image and the relation of feature points; estimating the planar displacement of the UAV in the world coordinate system; and calculating the distance variation between the UAV and the target according to the area variation of the feature point clusters. The displacement vector outputted by the UAV control system can be instantaneously fed back to the gimbal immediately for adjusting the camera pose or be inputted to the flight system for shooting a more stable aerial image.

What is claimed is:

1. An Unmanned Aerial Vehicle (UAV) control method adapted to a UAV with a camera for shooting a target comprising:
   obtaining a first image at a first timing;
   obtaining a second image by the camera at a second timing after the first timing;
   calculating a plurality of feature points respectively according to the first image and the second image by a computing device;
   extracting a first feature point set and a second feature point set by the computing device, wherein the first feature point set comprises at least three feature points from the plurality of the feature points of the first image, and the second feature point set comprises at least three feature points from the plurality of the feature points of the second image;

calculating a first-axial displacement and a second-axial displacement according to the first feature point set and the second feature point set by the computing device;

calculating a first region of interest (ROI) area and a second ROI area respectively according to the first feature point set and the second feature point set by the computing device and calculating a third-axial displacement according to the first ROI area and the second ROI area; and adjusting a camera pose or a flight path of the UAV according to the first-axial displacement, the second-axial displacement and the third-axial displacement by a control device.

2. The UAV control method according to claim 1, further comprising before the plurality of feature points is calculated by the computing device:

calculating a total difference amount according to the first image and the second image by the computing device; and obtaining the second image again when the total difference amount is smaller than a threshold value.

3. The UAV control method according to claim 1, wherein the computing device adopts a SIFT algorithm to calculate the plurality of feature points.

4. The UAV control method according to claim 1, wherein the computing device adopts PCA to extract the first feature point set and the second feature point set.

5. The UAV control method according to claim 1, further comprising before the first-axial displacement and the second-axial displacement are calculated:

using K-means clustering algorithm to partition the plurality of feature points for calculating the first-axial displacement and the second-axial displacement by the computing device.

6. The UAV control method according to claim 1, further comprising before the first image is obtained by the camera:

setting the flight path of the UAV by the control device.

7. An Unmanned Aerial Vehicle (UAV) control system comprising:

a camera configured to shoot a first image and a second image during a flight of a UAV, wherein the first image is shot at a first timing, the second image is shot at a second timing, and the first timing is earlier than the second timing;

a computing device electrically connected to the camera, wherein the computing device is configured to calculate a displacement vector of the UAV during the first timing and the second timing based on the first image and the second image; and a control device electrically connected to the computing device, wherein the computing device is configured to selectively adjust a gimbal for adjusting a camera pose or a flight path of the UAV according to the displacement vector, wherein the displacement vector comprises a first-axial displacement, a second-axial displacement, and a third-axial displacement, and the computing device further comprises:

a displacement computing device configured to calculate a plurality of feature points respectively according to the first image and the second image, to extract a first feature point set and a second feature point set, wherein the first feature point set comprises at least three feature points from the plurality of feature points of the first image and the second feature point set comprises at least three feature points from the plurality of feature points of the second image, and to calculate the first-axial displacement and the second-axial displacement according to the first feature point set and the second feature point set; and a depth computing device coupled to the displacement computing device, wherein the depth computing device is configured to calculate a first region of interest £ROI) area and a second ROI area according to the first feature point set and the second feature point set and to calculate a third-axial displacement according to the first ROI area and the second ROI area.

8. The UAV control system according to claim 7, wherein the control device further comprises a timer to accumulate an interval time during the first timing and the second timing.

9. The UAV control system according to claim 7, wherein the control device further comprises a positioning device configured to get a world coordinate of the UAV, and the control device adjusts the flight path of the UAV according to the world coordinate and the displacement vector.

10. An Unmanned Aerial Vehicle (UAV) comprising:

a flight system comprising a propeller configured to provide an upward buoyancy for the UAV by rotation; a motor coupled to the propeller with a spindle for providing a rotation power; and a motor drive electrically connected to the motor and configured to drive the motor according to a flight control instruction;

a control system comprising: a camera configured to shoot a first image and a second image during a flight of the UAV, wherein the first image is shot at a first timing, the second image is shot at a second timing, and the first timing is earlier than the second timing; a computing device electrically connected to the camera, wherein the computing device is configured to calculate a displacement vector of the UAV during the first timing and the second timing based on the first image and the second image; and a control device electrically connected to the computing device, wherein the control device is configured to selectively send a gimbal adjustment instruction for adjusting a camera pose or to send the flight control instruction for adjusting a flight path of the UAV according to the displacement vector;

a gimbal electrically connected to the camera and the control device, wherein the gimbal comprises a servomotor and the gimbal is configured to receive the gimbal adjustment instruction to drive the servomotor for adjusting the camera pose; and a frame configured to carry the flight system, the control system and the gimbal;

wherein the displacement vector comprises a first-axial displacement, a second-axial displacement, and a third-axial displacement, and the computing device further comprises:

a displacement computing device configured to calculate a plurality of feature points respectively according to the first image and the second image, to extract a first feature point set and a second feature point set, wherein the first feature point set comprises at least three feature points from the plurality of feature points of the first image and the second feature point set comprises at least three feature points from the plurality of feature points of the second image, and to calculate the first-axial displacement and the second-axial displacement according to the first feature point set and the second feature point set; and a depth computing device coupled to the displacement computing device, wherein the depth computing device is configured to calculate a first region of interest (ROI)

area and a second ROI area according to the first feature point set and the second feature point set and to calculate a third-axial displacement according to the first ROI area and the second ROI area.

* * * * *